United States Patent [19]
Reiss et al.

[11] 3,999,043
[45] Dec. 21, 1976

[54] PULSE WIDTH DETECTION CIRCUIT FOR ELECTRO-OPTICAL LABEL READING SYSTEM

[75] Inventors: Charles Reiss, W. Sayville; Leonard Zuckerman, Dix Hills, both of N.Y.

[73] Assignee: Servo Corporation of America, Hicksville, N.Y.

[22] Filed: June 2, 1975

[21] Appl. No.: 582,758

[52] U.S. Cl. .................. 235/61.11 E; 328/147; 340/146.3 K
[51] Int. Cl.² ............... G06K 7/14; H04B 1/04
[58] Field of Search .......... 340/146.3 K, 146.3 AG; 235/61.11 E; 178/7.6; 250/268–270; 328/135, 151, 112, 147; 307/234

[56] References Cited
UNITED STATES PATENTS

| | | | |
|---|---|---|---|
| 2,866,896 | 12/1958 | Stampfl | 328/112 |
| 3,299,271 | 1/1967 | Stites | 340/146.3 K |
| 3,668,532 | 6/1972 | Potash | 328/147 |

Primary Examiner—Daryl W. Cook
Assistant Examiner—Robert M. Kilgore
Attorney, Agent, or Firm—Kane, Dalsimer, Kane, Sullivan and Kurucz

[57] ABSTRACT

A circuit for producing an output pulse of predetermined amplitude and a width equal to the mid amplitude width of an input pulse from an electro-optical label reading system is provided. The present circuit comprises delay line means having a first output terminal and a second output terminal with the signal at the second output terminal being delayed twice the time of the delay at the first terminal. The first output terminal of the delay line is connected to an amplifier operative to double the amplitude of the signal applied thereto. The output of the amplifier is connected to one input of each of first and second comparators with the other input to the comparators respectively connected to the input signal source and the second terminal of the delay line. The output of the comparators is connected to the input to an AND gate with the output from the AND gate providing the desired pulse width information.

2 Claims, 3 Drawing Figures

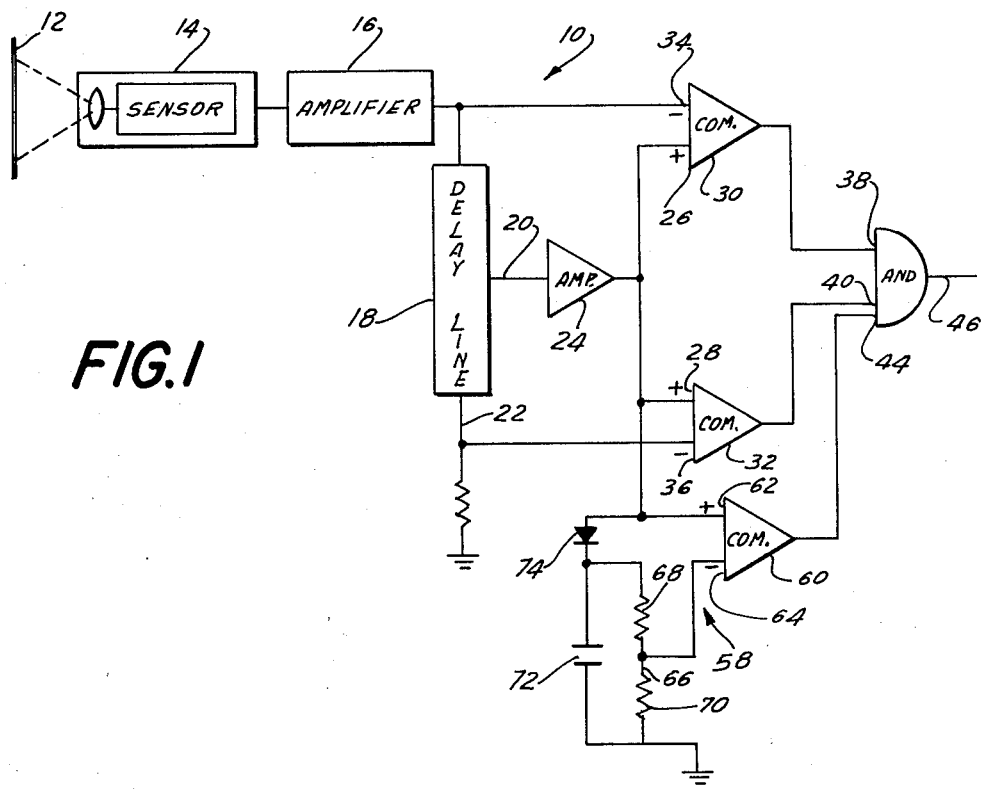
FIG.1
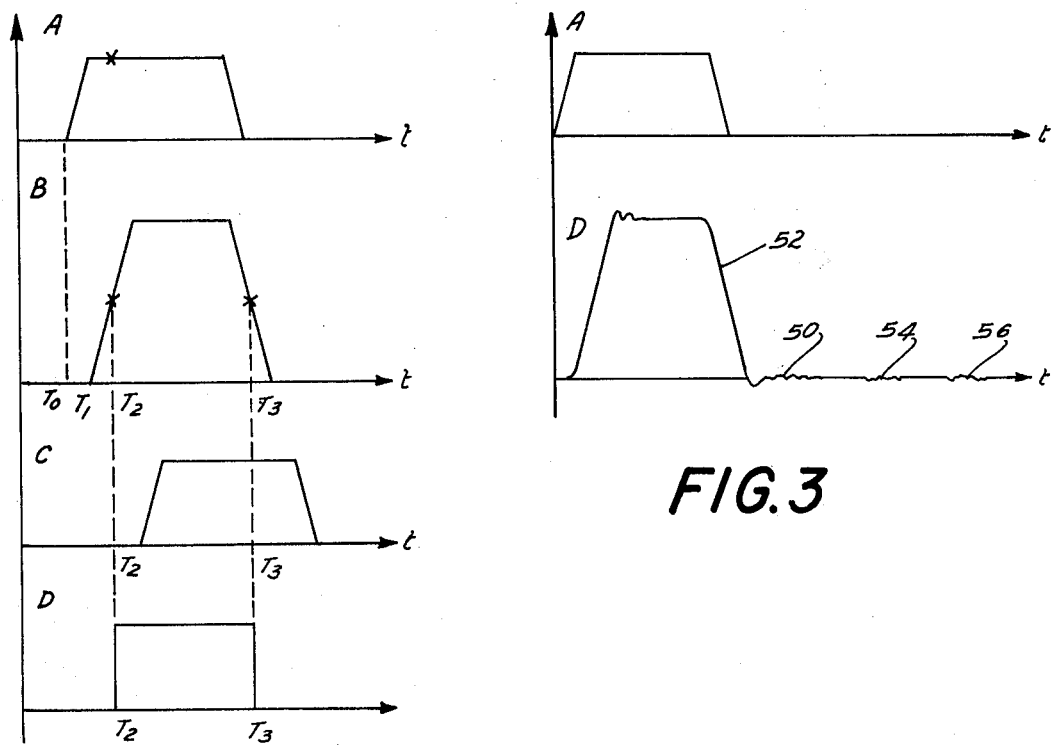
FIG.3
FIG.2

PULSE WIDTH DETECTION CIRCUIT FOR ELECTRO-OPTICAL LABEL READING SYSTEM

BACKGROUND OF THE INVENTION

The present invention relates to improved electronic circuitry for accurately measuring the width of pulses having widely varying amplitudes, rise times and wave shapes. More particularly, the invention is related to such a circuit for use in an electro-optical label reading system.

In U.S. Pat. No. 3,225,177 entitled MARK SENSING, there is disclosed a system for the electro-optical "reading" of labels on objects for purposes of object indentification. A system embodying the invention of this patent is marketed by the Servo Corporation of America of Hicksville, New York under the trademark KARTRAK.

Briefly stated, the system utilizes pulses resulting from the reflection of a beam of light onto a striped, color-coded label to produce a train of digital pulses indicative of the color-coded label. The width of each pulse is representative of the width of a corresponding stripe of the label scanned while the amplitude of each pulse varies as a function of the physical condition of the label. Generally speaking, the dirtier a label is, the weaker the resultant pulse.

The KARTRAK system referred to above is approved by the American Association of Railroads for railroad car identification. Accordingly, virtually every freight car in the country is provided with a KARTRAK label. These labels are exposed to a wide variety of environmental conditions and, as a result, their physical conditions vary widely. Thus, on any particular train, it would not be uncommon to have a few cars with virtually brand new labels and other cars with labels the stripes of which are barely discernible.

As a result of the above, it was recognized early in the development of the KARTRAK system that means for standardizing the output signals from the label scanner would have to be provided. The object of the standardizer is to provide an output pulse for each input pulse generated from a scanned label stripe with the amplitude of the output pulse being constant and the width being related to the width of the scanned pulse at the 50% amplitude value. Such a standardizer is disclosed in U.S. Pat. No 3,299,271 for ELECTRO-OPTICAL LABEL READING SYSTEM USING PULSE WIDTH DETECTION CIRCUIT.

As the above referenced patent (U.S. Pat. No. 3,299,271) points out (beginning at column 1, line 49) its design anticipates a variance in the amplitude of the returned optical signal over a 100:1 range. While this range was acceptable at the time the invention disclosed in this patent was made, it is no longer acceptable. This is because many of the older automatic car identification labels in actual use in the field for extended periods have gotten extremely dirty. New cars and cars with damaged labels have been provided with new labels which are clean. The dirty labels exhibit a very diminished optical response to the automatic car identification scanners while the very clean, new labels exhibit a relatively large response. As a result, it has been found that a dynamic range on the order of 1,000:1 — an improvement of 10 times that of the previously disclosed system is now required.

In view of the above, it is the principal object of the present invention to provide an improved standardizer circuit for an electro-optical label reading system capable of accurately producing constant amplitude output pulses of a width corresponding to the 50% amplitude pulse width of input pulses having amplitudes varying over a range on the order of 1,000:1.

SUMMARY OF THE INVENTION

The above and other beneficial objects and advantages are attained in accordance with the present invention by providing an improved circuit comprising delay line means having a first output terminal and a second output terminal with the signal at the second output terminal being delayed twice the time of the delay at the first terminal. The first output terminal of the delay line is connected to an amplifier operative to double the amplitude of the signal applied thereto. The output of the amplifier is connected to one input of each of first and second comparators with the other input to the comparators respectively connected to the input signal source and the second terminal of the delay line. The output of the comparators is connected to the input to an AND gate with the output from the AND gate providing the desired pulse width information.

BRIEF DESCRIPTION OF THE DRAWINGS

In the accompanying drawings:

FIG. 1 is a block diagram of a preferred embodiment of the present invention;

FIG. 2 is an idealized plot of pulse waveforms appearing at various identified points in the circuit of FIG. 1; and, FIG. 3 is a more realistic pulse waveform plot at the center tap output of the delay line of FIG. 1.

DETAILED DESCRIPTION OF THE PREFERRED EMBODIMENT

Reference is now made to the drawings and to FIG. 1 in particular wherein the circuit 10 of the present invention is shown in conjunction with an electro-optical label reading system incorporating a label 12 and scanning system 14 of the type disclosed in detail in U.S. Pat. No. 3,225,177. The label 12 is attached to the side of a railroad car or other object to be identified in a position so as to be scanned by a beam of light from a scanner unit 14. As described in U.S. Pat. No. 3,225,177, the label consists of an array of stripes arranged according to a code and representing an identifying number for the object. Details of the scanner 14 are immaterial for the present invention. Suffice it to say, the scanner 14 scans the label and as a result of light reflected off the label, produces a train of pulses of varying amplitude and pulse shape. These pulses are amplified in a suitable amplifier 16 prior to being "standardized" by the circuit 10 in accordance with the present invention. As stated, the standardized pulse has a fixed amplitude and a width corresponding to the width of the pulse at the output of amplifier 16 measured at the 50% amplitude point.

To this end, the present pulse width measuring circuit comprises a delay line 18 having a first output terminal 20 comprising its center tap and a second output terminal 22 at its far end. The delay at terminal 22 being twice the delay at terminal 20. The output of the center tap 20 of delay line 18 is fed through an amplifier 24 which doubles the strength of the signal applied thereto. The output of amplifier 24 is then fed to the positive terminals 26 and 28 of first and second comparators 30 and 32. The input to the negative terminal 34 of comparator 30 comprises the output of amplifier 16. The input to the negative terminal 36 of comparator 32 comprises the output at the far end terminal 22 of delay line 18. The outputs of comparators 30 and 32 are fed to inputs 38 and 40 of AND gate 42. AND gate 42 has a third input 44 which, for the present, may be disregarded. Thus, when input signals appear on both terminals 38 and 40 to AND gate 42, an output signal appears at the output terminal 46 of gate 42. As will be shown in connection with a description of FIG. 2, this occurs between the half amplitude points on the leading and trailing edges of the output pulse waveform from amplifier 16. Thus, the output of gate 42 represents the desired pulse.

Referring to FIG. 2, line A represents the output of amplifier 16 which is the input to delay line 18. Line B of FIG. 2 represents the output of amplifier 24 which, in turn, represents line A displaced in time by a period $T_1 - T_0$ and amplified by a factor of 2. Waveform A comprises the negative input to comparator 30 and waveform B comprises the positive input. As a result, until the amplitude of waveform B reaches and exceeds that of waveform A, no signal appears at input 38 to AND gate 42. However, as soon as the amplitude of waveform B reaches that of waveform A, an input does appear at terminal 38 of gate 42. As shown by the drawings, this occurs at time $T_2$ which represents the half amplitude point of waveform B.

In a somewhat similar manner, the positive input to comparator 32 is the output of amplifier 24 represented by waveform B. The negative input is represented by waveform C which is displaced in time from waveform A by twice the time period $T_1 - T_0$. As shown, comparator 32 produces an output signal while the amplitude of the output of amplifier 24 remains greater than the displaced signal represented by waveform C. This occurs until time $T_3$ after which the amplitude of waveform B falls below the 50% point so that the amplitude of waveform C is greater. Thus, positive signals appear at terminals 38 and 40 of gate 42 during the time period $T_2 - T_3$ producing the desired signal represented by waveform D at the output of the AND gate.

The above described circuit produces the desired objective of producing standardized output pulses (waveform D) for input pulses having amplitudes varying over a 1,000:1 range. As a result of the high degree of resolution obtainable by the above described circuit, resolution deficiencies inherent in delay line 18 present problems which may best be understood with reference to FIG. 3.

When a clean input signal, such as waveform A is applied to the delay line, ideally an output signal such as waveform B would appear at the output of amplifier 24 as shown in FIG. 2. In fact, the output of amplifier 24 more closely represents waveform D of FIG. 3. That is, the amplified output of the delay line center tap contains several bumps and overshoots as indicated in FIG. 3. The amplitude of these bumps and overshoots were sufficiently small so that where the dynamic range of the standardizer was on the order of 100:1 as in U.S. Pat. No. 3,299,271, the effect of these bumps and overshoots could be overlooked. However, in accordance with the present invention where the dynamic range of the standardizer is on the order of 1,000:1, the circuit cannot distinguish between delay line generated noise 50, 54 and 56 and real signals 52. While the delay noise could be suppressed by impressing a threshold on the system equal in level to the peak amplitude of the delay line generated noise in the presence of the greatest signal amplitude, doing so would defeat the principal object of the present invention, namely to have a greatly expanded dynamic range.

It was observed that the first order delay line noise 50 was always proportional to the peak amplitude of the pulse and that successive reflections 54 and 56 of the noise signals were each reduced in magnitude by a constant attenuation factor. It was observed from data from actual labels 12 that adjacent stripe data signals were never different in amplitude from one another by greater than a factor of 10. That is, on any particular label, the amplitude of the signal generated by one stripe never differed from the signal generated by an adjacent stripe by a factor of greater than 10. Taking advantage of both these observations, a filtering subcircuit 58 was developed to filter out the delay line noise 50, 54, 56.

To this end, subcircuit 58 comprises a third comparator 60 having a positive terminal 62 connected to the output of amplifier 24 and a negative terminal 64 connected to the junction 66 of a pair of series connected resisters 68 and 70 which, in turn, are shunted across a capacitor 72. Capacitor 72 extends between ground and a connection to the output of amplifier 24 through diode 74.

Subcircuit 58 detects the peak output of amplifier 24 for each stripe and stores it on capacitor 72. A portion of the peak value, determined by the ratio of resistors 68 and 70 (and selected to be less than 10%), is fed to the negative input of comparator 60. Thus, if successive pulses are less than the prescribed ratio, the comparator indicates that they are noise and should be rejected. This occurs by the failure of a signal to appear at input 44 to gate 42 thereby inhibiting the gate so that no output appears. Conversely, if the successive pulses are greater than the prescribed ratio, the comparator 60 accepts them a true label pulses so that an input to gate 42 does appear at terminal 44.

The voltage divider (resistors 68 and 70) in conjunction with capacitor 72 comprises an exponential decay whose time constant is chosen with regard to the delay time of the delay line and the attenuation of successive reflections 54 and 56. This decay is necessary since while the signals generated from stripes on any one label have been observed to never differ by more than a factor of 10, the signals generated from stripes appearing on successive labels can differ by a factor of 1,000:1. Stated another way, while the pulses generated in response to adjacent stripes on the same level will never differ in amplitude by more than a factor of 10, the pulse generated by the last stripe of a particular label can differ from the pulse generated by the first stripe of the next label by as much as a factor of 1,000.

Thus, in accordance with the above, the aforementioned objects are effectively attained.

Having thus described the invention, what is claimed is:

1. A circuit for producing an output pulse of predetermined amplitude and a width equal to the mid amplitude width of an input pulse from an input pulse source, said circuit comprising:
   delay line means having an input terminal connected to said input pulse source, a first output terminal and a second output terminal, the output of said delay line at said first output terminal being delayed in time with respect to said input pulse by a first predetermined period and the output of said delay line at said second output terminal being delayed in time with respect to said input pulse by twice said predetermined period;

amplifier means connected to said delay line first output terminal for doubling the amplitude of the output of said first terminal;

first comparator means having a first input connected to said input pulse source, a second input connected to said amplifier and an output;

second comparator means having a first input connected to said amplifier, a second input connected to said delay line second output terminal and an output;

gate means having a first input connected to said first comparator output and a second input connected to said second comparator output;

a capacitor connected to said amplifier;

a voltage divider subcircuit shunted across said capacitor; and, a third comparator having a first input connected to said amplifier, a second input connected to said subcircuit, and an output forming an additional input to said gate means.

2. In an electro-optical label reading system including a label containing coded data, apparatus for optically scanning said label, and a sensor operative in response to light reflected from said label to produce input signal pulses representative of said coded data, the improvement of a pulse width detector circuit comprising:

a delay line having an input terminal, a first output terminal and a second output terminal, the delay at said second output terminal being twice that at said first output terminal;

means for applying said input signal pulses to said delay line input terminal;

amplifier means connected to said delay line first output terminal and operative to produce output pulses equal to twice the output of said input pulses;

first and second comparators each having a first and second input terminal and an output terminal;

means connecting the output of said amplifier to the second input terminal of both said first and second comparators;

means connecting said first comparator first terminal to said input signal pulse applying means;

means connecting the second output terminal of said delay line to said second comparator first input terminal;

gate means responsive to output signals from both said first and second comparators, said gate means having a first input connected to the output of said first comparator and a second input connected to the output of said second comparator;

a capacitor connected to said amplifier;

a voltage divider subcircuit shunted across said capacitor; and, a third comparator having a first input connected to said amplifier, a second input connected to said subcircuit, and an output forming an additional input to said gate means.

* * * * *